(12) United States Patent
Baiju et al.

(10) Patent No.: US 12,252,175 B2
(45) Date of Patent: Mar. 18, 2025

(54) VEHICLE BODY

(71) Applicant: HONDA MOTOR CO., LTD., Tokyo (JP)

(72) Inventors: Kodai Baiju, Saitama (JP); Eiichiro Yokoi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 366 days.

(21) Appl. No.: 17/916,801

(22) PCT Filed: Feb. 2, 2021

(86) PCT No.: PCT/JP2021/003661
§ 371 (c)(1),
(2) Date: Oct. 4, 2022

(87) PCT Pub. No.: WO2021/205725
PCT Pub. Date: Oct. 14, 2021

(65) Prior Publication Data
US 2023/0159106 A1 May 25, 2023

(30) Foreign Application Priority Data
Apr. 6, 2020 (JP) ................................ 2020-068645

(51) Int. Cl.
*B62D 25/02* (2006.01)
*B62D 25/04* (2006.01)

(52) U.S. Cl.
CPC .......... *B62D 25/025* (2013.01); *B62D 25/02* (2013.01); *B62D 25/04* (2013.01)

(58) Field of Classification Search
CPC ....... B62D 25/02; B62D 25/04; B62D 25/025
USPC ............................. 296/209, 193.06, 23.01, 3
See application file for complete search history.

(56) References Cited

FOREIGN PATENT DOCUMENTS

| EP | 1241079 A2 | 9/2002 |
|---|---|---|
| JP | S54135413 U | 9/1979 |
| JP | 2002274425 A | 9/2002 |
| JP | 2005014716 A | 1/2005 |
| JP | 6070948 B2 | 2/2017 |

*Primary Examiner* — Dennis H Pedder
(74) *Attorney, Agent, or Firm* — CKC & Partners Co., LLC (57) ABSTRACT

A vehicle body (12) includes: a center pillar (26); a side sill; and a side outer panel (25, 61), in which the side outer panel (25, 61) includes: a base portion (52) that swells from the outer surface, enters the side sill (27) from the center pillar (26), and forms a front ridge (48, 64), and a rear ridge (51, 66); a front side sill portion (25b, 61b) that extends in a front-rear direction in front of the base portion (52) and forms a first groove (55, 76) between the front side sill portion (25b, 61b) and the base portion (52); and a rear side sill portion (25c, 61c) that extends in the front-rear direction behind the base portion (52) and forms a second groove (57, 78) between the rear side sill portion (25c, 61c) and the base portion (52).

12 Claims, 11 Drawing Sheets

VEHICLE BODY

TECHNICAL FIELD

The present invention relates to a vehicle body including a center pillar that is located at a boundary between a front side door and a rear side door and extends downward from a roof, a side sill that is coupled to a lower end of the center pillar to partition a lower end of a door opening opened and closed by the front side door and the rear side door, and a side outer panel that forms an outer surface with the center pillar and the side sill.

BACKGROUND ART

Patent Document 1 discloses a side sill that is coupled to a lower end of a center pillar and partitions a lower end of a door opening opened and closed by a front side door and a rear side door. The side sill includes an outer panel including: an upper wall that extends continuously from the center pillar so as to surround an opening for a front side door on a front side and an opening for a rear side door on a rear side; a vertical wall (side wall) that is formed by bending downward from an outer end of the upper wall and spreads along a vertical plane; and a lower wall that is formed by bending inward from a lower end of the vertical wall toward an interior space.

Patent Document 1: Japanese Patent No. 6070948

DISCLOSURE OF THE INVENTION

Problems to be Solved by the Invention

The outer panel of the side sill is formed with a step extending in a front-rear direction along an upper ridge of the vertical wall. A plurality of beads are arranged in the front-rear direction on the lower wall. Flexural rigidity of the side sill can be enhanced in the front-rear direction by a behavior of the step and the beads.

The side sill thermally expands in the front-rear direction based on heating during drying of electrodeposition painting. In Patent Document 1, since the rigidity of the lower wall is weakened at a central position in the front-rear direction, only the lower wall is exposed to permanent strain at the central position in the front-rear direction. The vertical wall is avoided from deforming in this way, and thus the satisfactory appearance is maintained. On the other hand, in such a structure, when the step of the vertical wall is omitted or the vertical wall extends in an up-down direction (height direction), the permanent strain may not be absorbed in time and the permanent strain may appear on the vertical wall. Therefore, the design of the side sill is limited.

An object of the present invention is to provide a vehicle body capable of preventing (avoiding) deformation of the side sill that is visible while allowing a variety of designs of the side sill.

Means for Solving the Problems

According to a first aspect of the present invention, a vehicle body includes: a center pillar that is located at a boundary between a front side door and a rear side door and extends downward from a roof; a side sill that is coupled to a lower end of the center pillar and partitions a lower end of a door openings opened and closed by the front side door and the rear side door; and a side outer panel that forms an outer surface with the center pillar and the side sill and includes a first ridge that partitions an opening for the front side door and a second ridge that partitions an opening for the rear side door, in which the side outer panel includes: a base portion that swells from the outer surface, enters the side sill from the center pillar, and forms a front ridge extending along the first ridge of the center pillar and crossing an upper edge of the side sill, and a rear ridge extending along the second ridge of the center pillar and crossing an upper edge of the side sill; a front side sill portion that extends in a front-rear direction in front of the base portion and forms a first groove between the front side sill portion and the base portion; and a rear side sill portion that extends in the front-rear direction behind the base portion and forms a second groove between the rear side sill portion and the base portion.

According to a second aspect, in addition to the configuration of the first aspect, a side wall of the first groove is continuous from the front ridge, and a side wall of the second groove is continuous from the rear ridge.

According to a third aspect, in addition to the configuration of the first or second aspect, the vehicle body further includes a first bead that is formed on the front side sill portion and extends in the front-rear direction and a second bead that is formed on the rear side sill portion and extends in the front-rear direction.

According to a fourth aspect, in addition to the configuration of the third aspect, the first bead and the second bead include beads that are recessed inward within beads that swell outward, respectively.

According to a fifth aspect, in addition to the configuration of the third aspect, the first bead and the second bead include curved surfaces that have a generating line extending in the front-rear direction and are curved so as to swell outward, respectively.

According to a sixth aspect, in addition to the configuration of the third aspect, an upper end and a lower end of the first groove are partitioned by steps that are formed on extension lines of an upper edge and a lower edge of the first bead, respectively, and an upper end and a lower end of the second groove are partitioned by steps that are formed on extension lines of an upper edge and a lower edge of the second bead, respectively.

According to a seventh aspect, in addition to the configuration of the first aspect, the side outer panel includes: a front upper wall that extends continuously from the center pillar so as to surround the opening for the front side door; a front vertical wall that is formed by bending downward from an outer end of the front upper wall and spreads along a vertical plane to define the first ridge between the front vertical wall and the front upper wall; and a front lower wall that is formed by bending toward an interior space from a lower end of the front vertical wall to define a third ridge between the front lower wall and the front vertical wall, and the front lower wall includes an electrodeposition hole formed at a front-rear direction position intersecting the first groove.

According to an eighth aspect, in addition to the configuration of the first aspect, the side outer panel includes: a rear upper wall that extends continuously from the center pillar so as to surround the opening for the rear side door; a rear vertical wall that is formed by bending downward from an outer end of the rear upper wall and spreads along a vertical plane to define the second ridge between the rear vertical wall and the rear upper wall; and a rear lower wall that is formed by bending toward an interior space from a lower end of the rear vertical wall to define a fourth ridge between the rear lower wall and the rear vertical wall, and the rear lower wall includes a bead formed at a front-rear direction position intersecting the second groove and extending orthogonally to the fourth ridge.

According to a ninth aspect, in addition to the configuration of the first aspect, the side outer panel further includes an auxiliary base portion that swells from the outer surface while continuing upward from the base portion, a door hinge mounting area being arranged between the auxiliary base portion and the base portion.

According to a tenth aspect, in addition to the configuration of the first aspect, the base portion forms a receiving body that swells in a truncated cone shape from the outer surface at a position closer to the first groove than the second groove and receives a stopper of the front side door at a closed position of the front side door.

According to an eleventh aspect, in addition to the configuration of the first aspect, the vehicle body further includes: a side sill stiffener that is joined to a side sill inner panel to form the side sill while reinforcing a flexural strength of the side sill; and a center pillar stiffener that is joined to a center pillar inner panel to form the center pillar while reinforcing a flexural strength of the center pillar and is coupled to the side sill stiffener at a lower end partitioned in the front-rear direction at the first groove and the second groove.

Effects of the Invention

According to the first aspect, the front side sill portion and the rear side sill portion of the side outer panel thermally expand in the front-rear direction based on heating during drying of electrodeposition painting. At this time, since the rigidity of the base portion is ensured by the behavior of the swelling forming the front ridge and the rear ridge, the thermal expansion of the front side sill portion and the thermal expansion of the rear side sill portion can be absorbed according to the collapse of the first groove and the second groove. Below the center pillar, the side sill can prevent (avoid) the occurrence of permanent strain of the side outer panel. Since only the first groove and the second groove collapse, the visible side sill is prevented (avoided) from deforming.

According to the second aspect, when the side outer panel appears on the exterior of the vehicle, the first groove and the second groove are visually integrated with the base portion, and thus the deterioration of the appearance can be prevented regardless of the formation of the first groove and the second groove.

According to the third aspect, since the front side sill portion and the rear side sill portion are enhanced in flexural rigidity in the front-rear direction, it is possible to promote the collapse of the first groove and the second groove while preventing the deformation of the front side sill portion and the rear side sill portion.

According to the fourth aspect, since the front side sill portion and the rear side sill portion are further enhanced in flexural rigidity in the front-rear direction, it is possible to promote the collapse of the first groove and the second groove while preventing the deformation of the front, side sill portion and the rear side sill portion.

According to the fifth aspect, since the front side sill portion and the rear side sill portion are enhanced in flexural rigidity in the front-rear direction, it is possible to promote the collapse of the first groove and the second groove while preventing the deformation of the front side sill portion and the rear side sill portion. Moreover, since the first bead and the second bead form the curved surface that swells outward, the first bead and the second bead can be satisfactorily visually recognized from a line of sight looking downward of the occupant getting on and off. The existence of the vertical wall can be confirmed. Designability can be ensured. When the vertical wall of the bead is hidden from the line of sight looking downward of the occupant, the occupant misunderstands that the vertical wall is missing. It becomes a design that makes feel instability of the structure.

According to the sixth aspect, the depth of the first groove and the second groove can be increased by the behavior of the step. Deformation of the first groove and the second groove can be promoted when the first groove and the second groove are deepened. Moreover, since the step extends in a straight line from the first bead and the second bead, a complicated uneven shape can be reduced and the appearance can be satisfactorily ensured.

According to the seventh aspect, since the strength of the front lower wall is weakened at the front-rear direction position intersecting the first groove by the behavior of the electrodeposition hole, the deformation of the bottom wall can be promoted in the first groove in addition to the fall of the side wall. The collapse of the first groove can be further accelerated. In this way, the thermal expansion of the front side sill portion can be absorbed. In the side sill, the occurrence of the permanent strain of the side outer panel can be prevented (avoided).

According to the eighth aspect, the beads can prevent spring-back between the rear vertical wall and the rear lower wall at the time of molding the side outer panel. Although these beads are formed on the rear lower wall at the front-rear direction position intersecting the second groove, a stress is concentrated at a central position of the side sill in the front-rear direction, the stress concentrated in this way is absorbed by the first groove, and the second groove on the rear side plays a complementary role, whereby the beads do not hinder the prevention of the thermal expansion.

According to the ninth aspect, since the base portion and the auxiliary base portion are continuous so as to surround the door hinge mounting area, it is possible to reduce a complicated uneven shape and further improve the appearance, such simplification of the uneven shape can prevent the occurrence of wrinkles during a pressing process of the side outer panel. Moreover, since the rigidity of the base portion is further increased due to the addition of the auxiliary base portion, the absorption of thermal expansion can be further promoted in the first groove and the second groove.

According to the tenth aspect, in the base portion, the rigidity can be increased on the first groove side as compared with the second groove side. Since the stress is concentrated at the central position of the side sill in the front-rear direction, the collapse of the first, groove can be satisfactorily promoted.

According to the eleventh aspect, during a side collision, the impact acting on the center pillar stiffener is supported by the side piller coupled to the lower end of the center pillar stiffener. At this time, since the first groove and the second groove are arranged at the edge of the center pillar stiffener, the first groove and the second groove do not affect the collision performance during the side collision.

EXPLANATION OF REFERENCE NUMERALS 12 vehicle body
13 front side door
14 rear side door
15 door
15a (for front side door) opening
15b (for rear side door) opening
18 roof
25 side outer panel
25b front side sill portion
25c: rear side sill portion
26 center pillar
27 side sill
29 first ridge
32 second ridge
47 (side sill) upper edge
48 front ridge
49 (side sill) upper edge
51 rear ridge
52 base portion
53 door hinge mounting area
54 receiving body
55 first groove
56 first bead
56a swelled bead (outer bead)
56b recessed bead (inner bead)
57 second groove
58 second bead
58a swelled bead (outer bead)
58b recessed bead (inner bead)
61 side outer panel
61b front side sill portion
61c rear side sill portion
62 auxiliary base portion
63 (side sill) upper edge
64 front ridge
65 (side sill) upper edge
66 rear ridge
67 front upper wall
68 front vertical wall
69 third ridge
71 front lower wall
72 rear upper wall
73 rear vertical wall
74 fourth ridge
75 rear lower wall
76 first groove
77 first bead
77a curved surface
78 second groove
79 second bead
79a curved surface
81 (of first groove) step
82 (of second groove) step
83 electrodeposition hole
84 bead
85 side sill inner panel
86 side sill stiffener
87 center pillar inner panel
88 center pillar stiffener
88a lower end
Pf (intersecting first groove) front-rear direction position
Pr (intersecting second groove) front-rear direction position

PREFERRED MODE FOR CARRYING OUT THE INVENTION

Hereinafter, embodiments of the present invention will be described with reference to the accompanying drawings. Here, up, down, front, rear, left, and right of a vehicle body are defined based on a line of sight of an occupant who rides on an automobile four-wheeled vehicle.

First Embodiment

Figure 1:
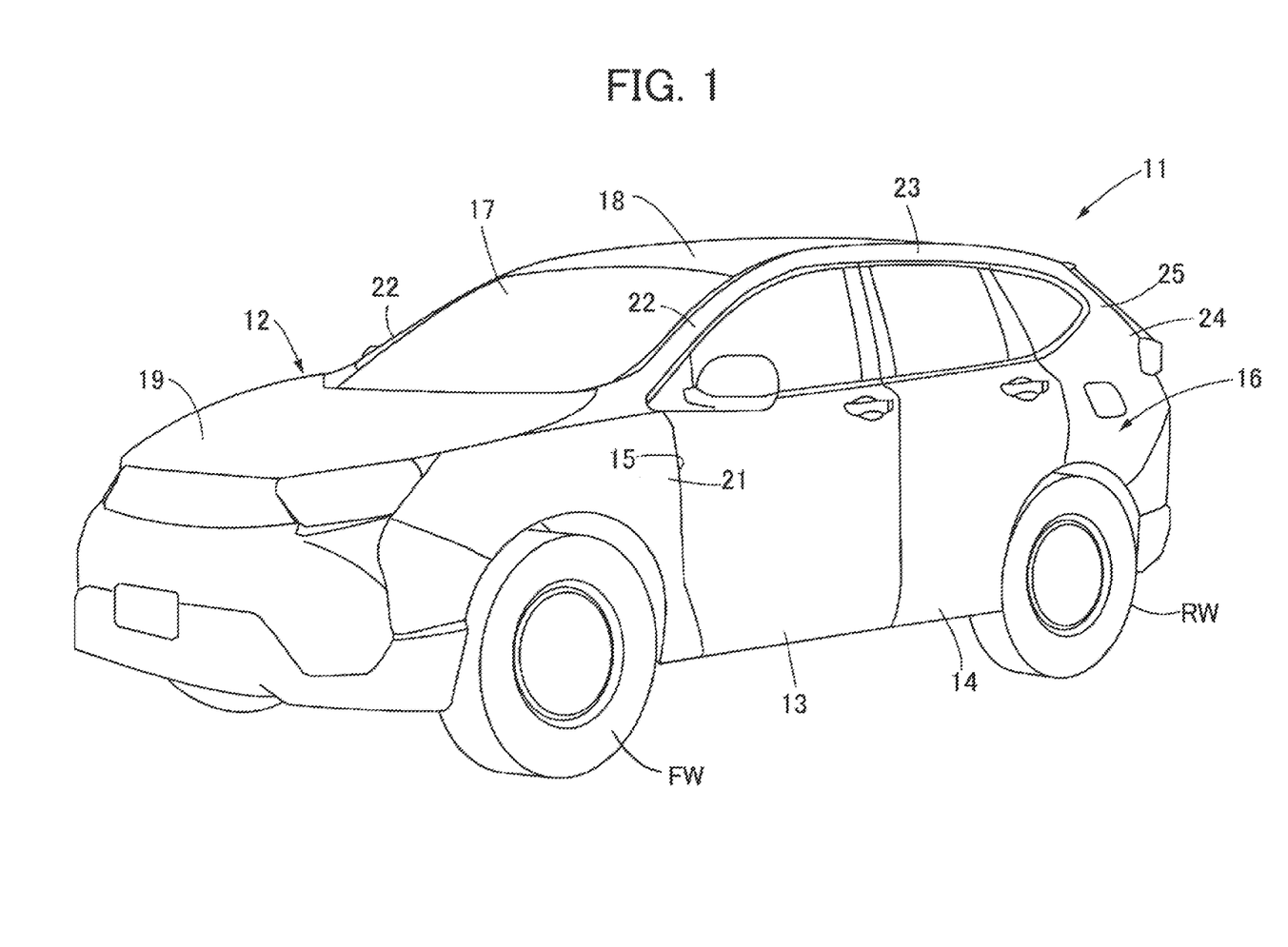
FIG. 1 is a perspective view showing an appearance of a vehicle according to an embodiment of the present invention; (first embodiment)

FIG. 1 schematically shows an entire vehicle according to a first embodiment of the present invention. A vehicle (automobile four-wheeled vehicle) 11 includes a vehicle body 12 that is supported so as to travel freely by left and right front wheels FW and left and right rear wheels FW. The vehicle body 12 includes left and right side panels 16 that define door openings 15 opened and closed by a front side door 13 and a rear side door 14 and a roof 18 that partitions an upper edge of the windshield 17 and connects upper ends of the left and right side panels 16. As will be described below, the side panel 16 is configured by a combination body of a plurality of structures (panels). The side panel 16 includes left and right front side panels 21 that partition side edges of a bonnet 19 spreading forward from a front edge of the windshield 17 to form left and right, outer surfaces above the front wheels FW, front pillars 22 that partition side edges of the windshield 17, roof side rails 23 that are continuous from rear ends of the front pillars 22 and are coupled to side edges of the roof 18, and rear side panels 24 that are continuous from rear ends of the roof side rails 23 and partition a side end of a gate opening opened and closed by a rear gate to form left and right outer surfaces above the real wheels RW. When the front side door 13 and the rear side door 14 are opened, an occupant can get on and off the interior space. An outer surface of the front pillar 22, an outer surface of the roof side rail 23, and an outer surface of the rear side panel 24 are formed of a side outer panel 25 molded from one steel plate.

Figure 2:
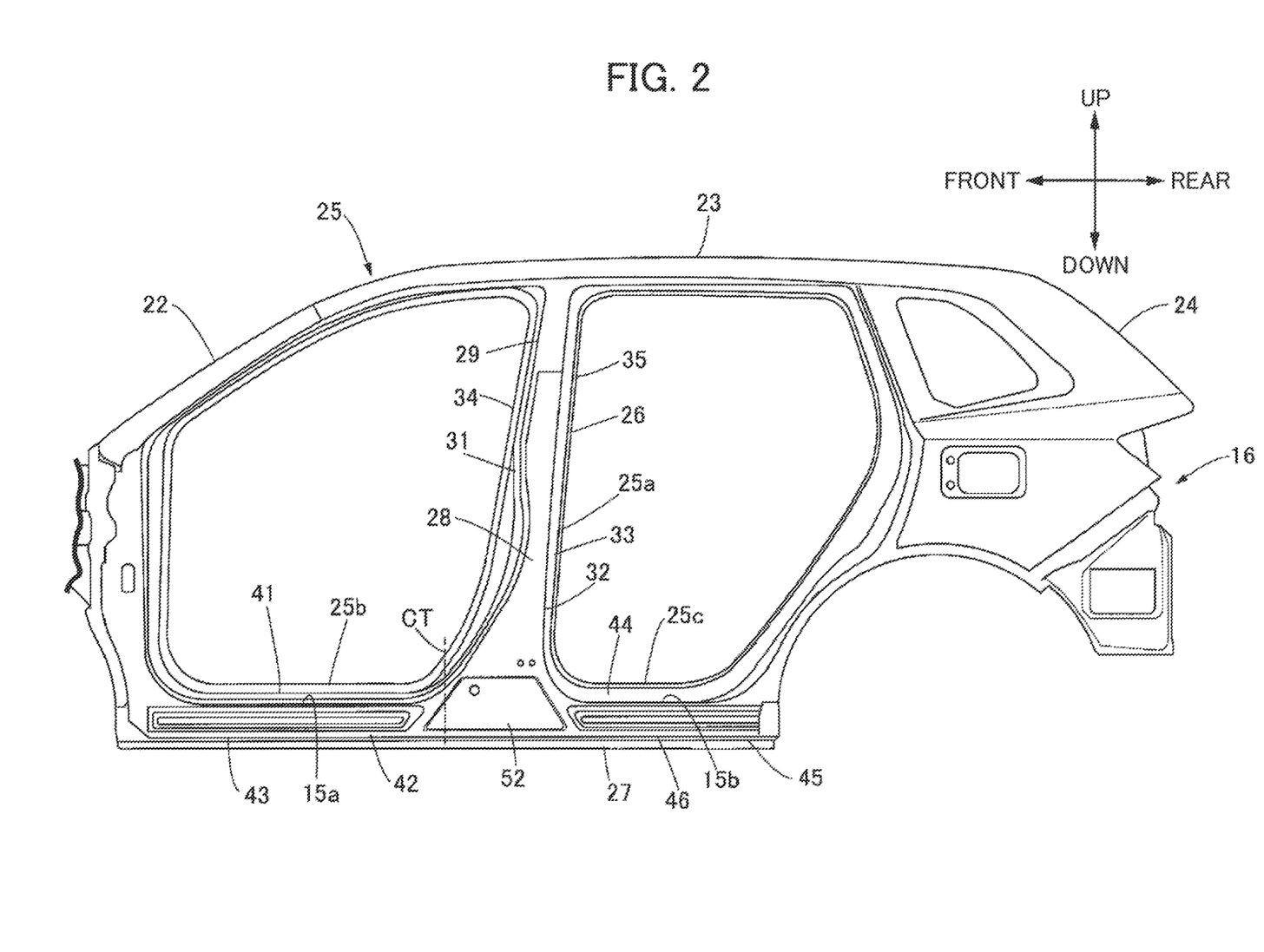
FIG. 2 is a side view of a side panel according to a first, embodiment of the present invention; (first embodiment)

As shown in FIG. 2, the side panel 16 further includes a center pillar 26 that is located at a boundary between the front side door 13 and the rear side door 14 and extends downward from the roof 18 and a side sill 27 that extends linearly in a front-rear direction (in a horizontal direction) and partitions a lower end of the door opening 15 opened and closed by the front side door 13 and the rear side door 14. A lower end of the center pillar 26 is coupled to the side sill 27. The side outer panel 25 is continuous to the outer surface of the front pillar 22, the outer surface of the roof side rail 23, and the outer surface of the rear side panels 24 to form an outer surface of the center pillar 26 and an outer surface of the side sill 27.

A center pillar portion 25a of the side outer panel 25 includes; a side wall 28 that extends in an up-down direction from the roof side rail 23 to the side sill 27 at a position facing the outer face of the side inner panel; a front wall 31 that is formed by bending from a front end of the side wall 28 to form a first ridge 29 between the front wall 31 and the side wall 28; and a rear wall 33 that is formed by bending from a rear end of the side wall 28 to form a second ridge 32 between the rear wall 33 and the side wall 28. An inner end of the front wall 31 is connected with a front, overlap space 34 that is formed by bending forward from the inner end of the front wall 31 to form a ridge with the front wall 31 and is overlapped with the side inner panel. In this way, the front wall 31 is joined to the side inner panel with the front overlap space 34. For example, welding can be used for joining. Similarly, an inner end of the rear wall 33 is connected with a rear overlap space 35 that is formed by bending rearward from the inner end of the rear wall 33 to form a ridge with the rear wall 33 and is overlapped with the side inner panel. In this way, the rear wall 33 is joined to the side inner panel with the rear overlap space 35. For example, welding can be used for joining.

The side outer panel 25 includes: a front side sill portion 25b that extends forward in the horizontal direction from the center pillar portion 25a and forms an outer surface of the side sill 27 in front of the center pillar 26; and a rear side sill portion 25c that extends rearward in the horizontal direction from the center pillar portion 25a and forms an outer surface of the side sill 27 behind the center pillar 26. The first ridge 29 is continuous with a ridge of the front side sill portion 25b while being curved from the center pillar 26 and extends linearly in the front-rear direction (horizontal direction) at the front side sill portion 25b. An opening 15a for the front side door 13 is partitioned by the first ridge 29. The second ridge 32 is continuous with a ridge of the rear side sill portion 25c while being curved from the center pillar 26 and extends linearly in the front-rear direction (horizontal direction) at the rear side sill portion 25c. An opening 15b for the rear side door 14 is partitioned by the second ridge 32.

The front side sill portion 25b includes: a front upper wall 41 that extends continuously from the front wall 31 of the center pillar portion 25a to surround the opening 15a for the front side door 13; a front vertical wall 42 that spreads along a vertical plane by being bent downward from an outer end of the front upper wall 41 and defines the first ridge 29 between the front vertical wall 42 and the front upper wall 41; and a front lower wall 43 that is bent toward the interior space from a lower end of the front vertical wall 42 and defines the ridge between the front lower wall 43 and the front vertical wall 42.

The rear side sill portion 25c includes: a rear upper wall 44 that extends continuously from the rear wall 33 of the center pillar portion 25a to surround the opening 15b for the rear side door 14; a rear vertical wall 45 that spreads along a vertical plane by being bent downward from an outer end of the rear upper wall 44 and defines the second ridge 32 between the rear vertical wall 45 and the rear upper wall 44; and a rear lower wall 46 that is bent toward the interior space from a lower end of the rear vertical wall 45 and defines the ridge between the rear lower wall 46 and the rear vertical wall 45. The rear lower wall 46 and the front lower wall 43 are continuous as one lower wall of the side sill 27.

Figure 3:
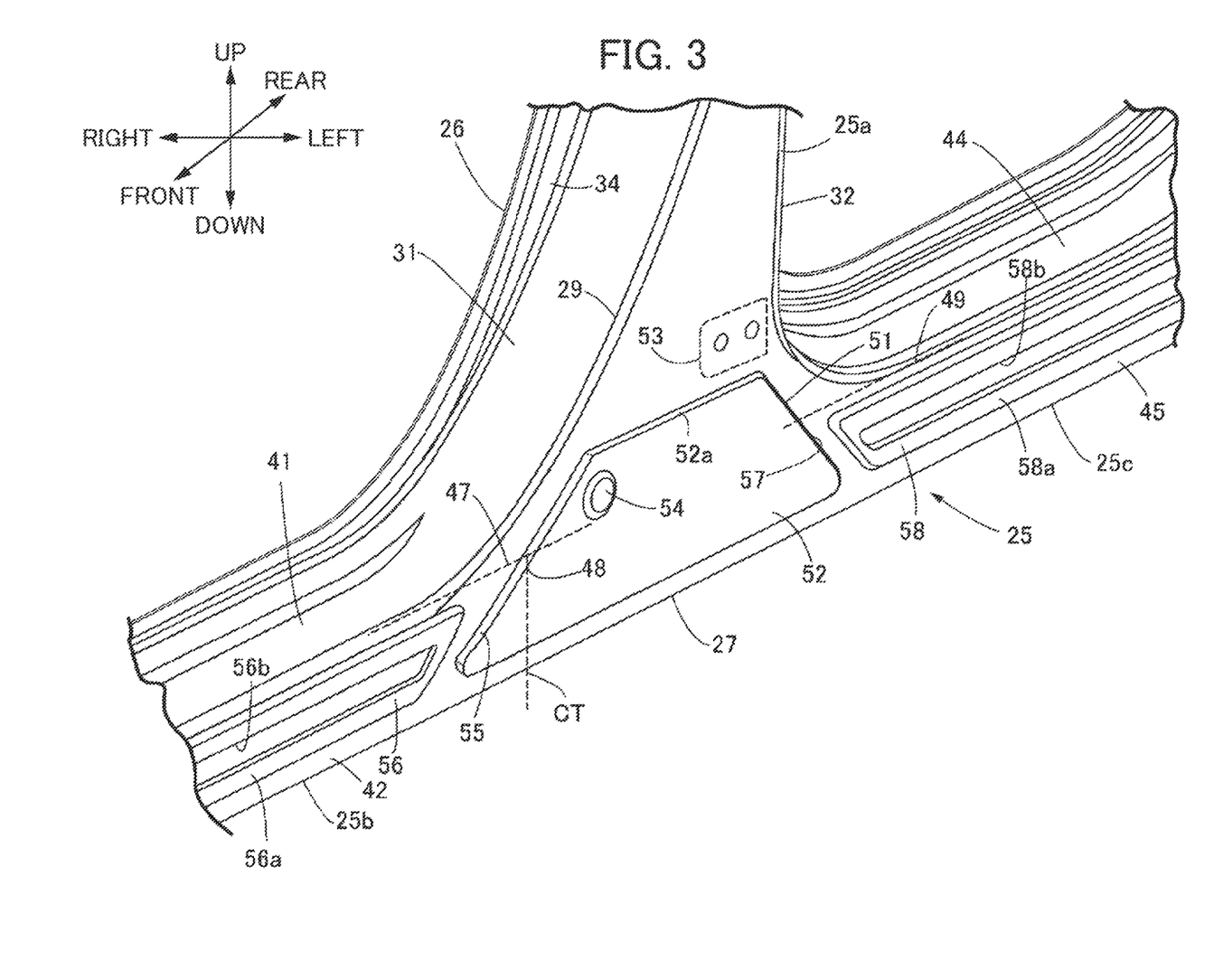
FIG. 3 is an enlarged perspective view showing a shape of a side outer panel; (first embodiment)

As shown in FIG. 3, the side outer panel 25 includes a base portion 52 that swells from the outer surface, enters the side sill 27 from the center pillar 26, and forms the front ridge 43 extending along the first ridge 29 of the center pillar portion 25a and crossing an upper edge 47 of the front side sill portion 25b and the rear ridge 51 extending along the second ridge 32 of the center pillar portion 25a and crossing an upper edge 49 of the rear side sill portion 25c. The upper edge 47 of the front side sill portion 25b corresponds to the upper end of the front vertical wall 42. The upper edge 49 of the rear side sill portion 25c corresponds to the upper end of the rear vertical wall 45. Here, the base portion 52 is partitioned by a contour line 52a extending in the horizontal direction below the door hinge area 53 to which a door hinge of the rear side door 14 is mounted. The base portion 52 forms a receiving body 54 that swells in a truncated cone shape from the outer surface at a position closer to the front ridge 43 than the rear ridge 51 and receives a stopper (not shown) of the front side door 13 at a closed position of the front side door 13. The stopper is formed from an elastic body such as rubber. The receiving body 54 is covered with the front side door 13 at the closed position.

The front side sill portion 25b includes a first bead 56 that extends in the front-rear direction in front of the base portion 52 and forms a first groove 55 between the first bead 56 and the base portion 52 along the front ridge 48. A side wall of the first groove 55 is continuous from the front ridge 48. The first bead 56 includes an inner bead 56b that is recessed inward within a bead 56a that swells outward.

The rear side sill portion 25c includes a second bead 58 that extends in the front-rear direction behind the base portion 52 and forms a second groove 57 between the second bead 58 and the base portion 52 along the rear ridge 51. A side wall of the second groove 57 is continuous from the rear ridge 51. The second bead 58 includes an inner bead 58b that is recessed inward within a bead 58a that swells outward.

The side outer panel 25 is subjected to painting when the vehicle 11 is manufactured. For example, electrodeposition painting is used for the painting. Since the side outer panel 25 appears on the outer surface of the vehicle 11, the aesthetic appearance of the vehicle 11 can be established by the behavior of the painting. In the electrodeposition painting, the side outer panel 25 pulled up from a painting liquid is heated. A painting film of the side outer panel 25 is dried by the heating. At this time, the front side sill portion 25b and the rear side sill portion 25c of the side outer panel 25 are thermally expanded in the front-rear direction based on the heating. Since rigidity of the base portion 52 is ensured by the behavior of the swelling forming the front ridge 48 and the rear ridge 51, the thermal expansion of the front side sill portion 25b and the thermal expansion of the rear side sill portion 25c can be absorbed according to the collapse of the first groove 55 and the second groove 57. Here, when the first groove 55 collapses, the side wall on the base portion continuous from the front ridge 48 and the side wall on the first bead facing the side wall fall down with respect to the bottom wall of the first groove 55. When the second groove 57 collapses, the side wall on the base portion continuous from the rear ridge 51 and the side wall on the second bead 58 facing the side wall fall down with respect to the bottom wall of the second groove 57. In this way, the occurrence of permanent strain of the side outer panel 25 can be prevented (avoided) in the side sill 27 below the center pillar 26. Since only the first groove 55 and the second groove 57 collapse, the visible deformation of the side sill 27 can be prevented (avoided).

In the present embodiment, the side wall of the first groove 55 is continuous from the front ridge 48, and the side wall of the second groove 57 is continuous from the rear ridge 51. Therefore, when the side outer panel 25 appears on the exterior of the vehicle 11, the first groove 55 and the second groove 57 are visually integrated with the base portion 52, and thus the deterioration of the appearance can be prevented regardless of the formation of the first groove 55 and the second groove 57.

In the side outer panel 25 according to the present embodiment, the front side sill portion 25b is formed with the first bead 56 extending in the front-rear direction, and the rear side sill portion 25c is formed with the second bead 58 extending in the front-rear direction. Thus, since the front side sill portion 25b and the rear side sill portion 25c are enhanced in flexural rigidity in the front-rear direction, it is possible to promote the collapse of the first groove 55 and the second groove 57 while preventing the deformation of the front side sill portion 25b and the rear side sill portion 25c.

The first bead 56 and the second bead 53 include the inner beads 56b and 53b that are recessed inward within the beads 56a and 53a that swell outward, respectively. Thus, since the front side sill portion 25b and the rear side sill portion 25c are further enhanced in flexural rigidity in the front-rear direction, it is possible to promote the collapse of the first groove 55 and the second groove 57 while preventing the deformation of the front side sill portion 25b and the rear side sill portion 25c.

In the present embodiment, the base portion 52 forms the receiving body 54 that swells in the truncated cone shape from the outer surface at the position closer to the first groove 55 than the second groove 57 and receives the stopper of the front side door 13 at the closed position of the front side door 13. In the base portion 52, the rigidity can be increased on the side of the first groove 55 as compared with the side of the second groove 57. Since the stress is concentrated at the central position CT of the side sill 27 in the front-rear direction, the collapse of the first groove 55 can be satisfactorily promoted.

Second Embodiment

Figure 4:
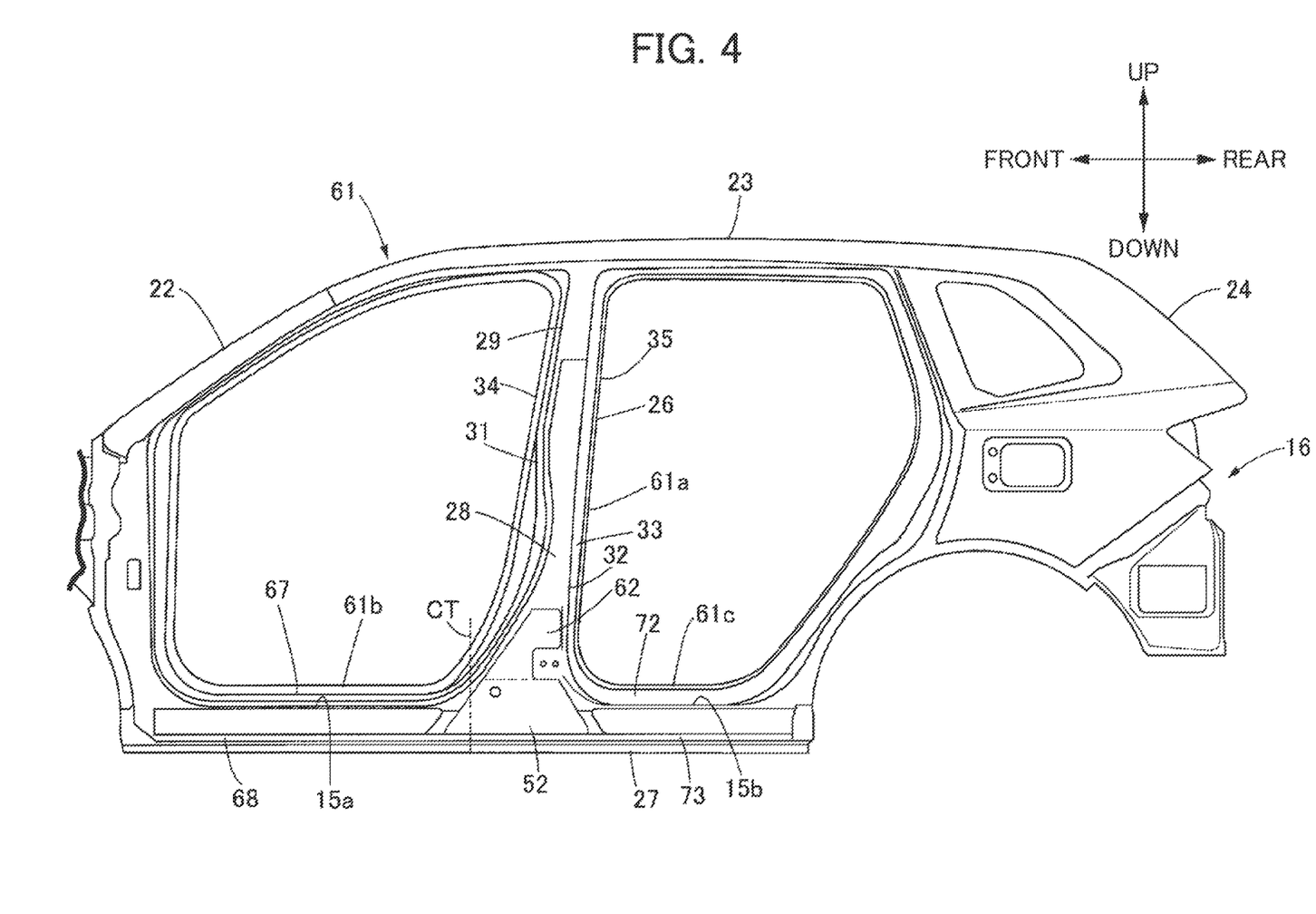
FIG. 4 is a side view of a side panel according to a second embodiment of the present invention; (second embodiment)

FIG. 4 shows a side panel 16 of a vehicle according to a second embodiment of the present invention. A side outer panel 61 includes a front side sill portion 61b that extends forward in a horizontal direction from a center pillar portion 61a and forms an outer surface of a side sill 27 in front of a center pillar 26, and a rear side sill portion 61c that extends rearward in the horizontal direction from the center pillar portion 61a and forms an outer surface of the side sill 27 behind the center pillar 26. A first ridge 29 is continuous with a ridge of the front side sill portion 61b while being curved from the center pillar 26 and extends linearly in a front-rear direction (horizontal direction) at the front side sill portion 61b. An opening 15a for a front side door 13 is partitioned by the first ridge 29. A second ridge 32 is continuous with a ridge of the rear side sill portion 61c while being curved from the center pillar 26 and extends linearly in the front-rear direction (horizontal direction) at the rear side sill portion 61c. An opening 15b for a rear side door 14 is partitioned by the second ridge 32.

Figure 5:
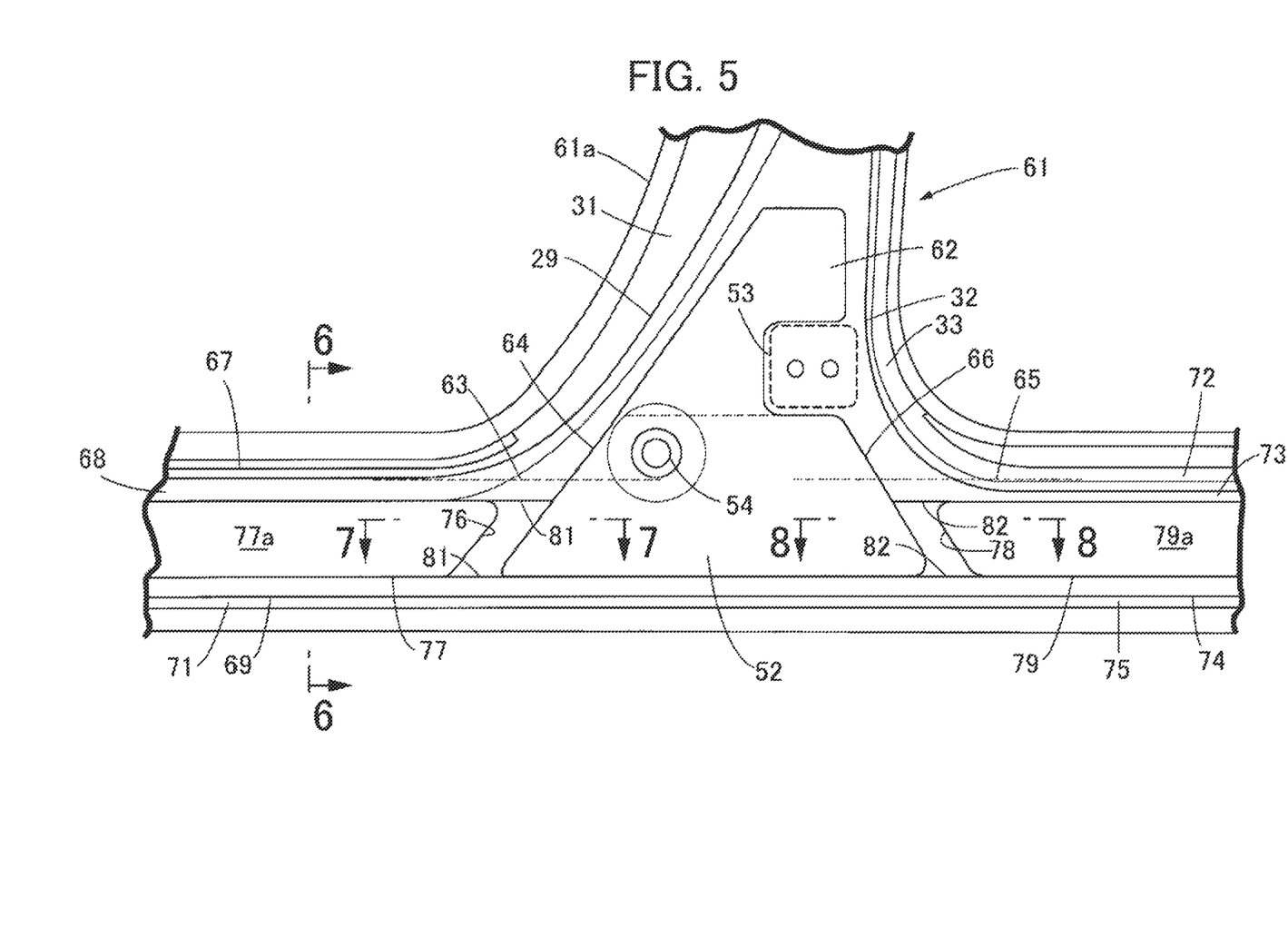
FIG. 5 is an enlarged side view showing a shape of a side outer panel; (second embodiment)

In addition to the above-described base portion 52, the side outer panel 61 further includes an auxiliary base portion 62 that swells from the outer surface while continuing upward from the base portion 52, a door hinge area 53 being arranged between the auxiliary base portion 62 and the base portion 52. As shown in FIG. 5, the base portion 52 and the auxiliary base portion 62 form a front ridge 64 extending along the first ridge 23 of the center pillar portion 61a and crossing an upper edge 63 of the front side sill portion 61b. The front ridge 64 is linearly continuous with the base portion 52 and the auxiliary base portion 62. The base portion 52 and the auxiliary base portion 62 form a rear ridge 66 extending along the second ridge 32 of the center pillar portion 61a while bypassing the door hinge area 53 and crossing an upper edge 65 of the rear side sill portion 61c. The rear ridge 66 is linearly continuous with the base portion 52 and the auxiliary base portion 62. As described above, the base portion 52 forms a receiving body 54 that swells in a truncated cone shape from the outer surface at a position closer to the front ridge 64 than the rear ridge 66 and receives a stopper (not shown) of the front side door 13 at a closed position of the front side door 13.

The front side sill portion 61b includes: a front upper wall 67 that extends continuously from a front wall 31 of the center pillar portion 61a to surround the opening 15a for the front side door 13; a front vertical wall 68 that spreads along a vertical plane by being bent downward from an outer end of the front upper wall 67; and defines the first ridge 29 between the front vertical wall 68 and the front upper wall 67, and a front lower wall 71 that is bent toward the interior space from a lower end of the front vertical wall 68 and defines a third ridge 69 between the front lower wall 71 and the front vertical wall 68.

The rear side sill portion 61c includes: a rear upper wall 72 that extends continuously from a rear wall 33 of the center pillar portion 61a to surround the opening 15b for the rear side door 14; a rear vertical wall 73 that spreads along a vertical plane by being bent downward from an outer end of the rear upper wall 72 and defines a second ridge 32 between the rear vertical wall 73 and the rear upper wall 72; and a rear lower wall 75 that is bent toward the interior space from a lower end of the rear vertical wall 73 and defines a fourth ridge 74 between the rear lower wall 75 and the rear vertical wall 73. The rear lower wall 75 and the front lower wall 71 are continuous as one lower wall of the side sill 27.

Figure 6:
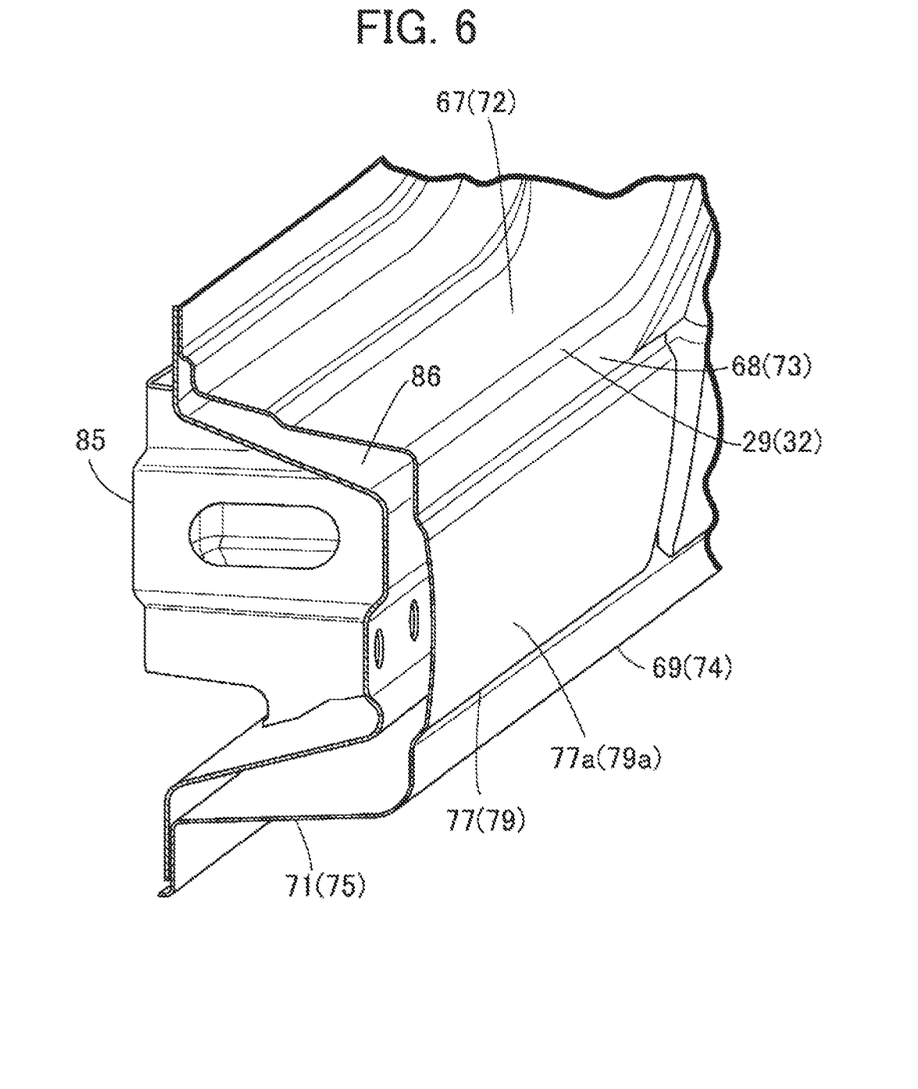
FIG. 6 is a cross-sectional view taken along a line 6-6 in FIG. 5; (second embodiment)

The front side sill portion 61b includes a first bead 77 that extends in the front-rear direction in front of the base portion 52 and forms a first groove 76 between the first bead 77 and the base portion 52 along the front ridge 64. A side wall of the first groove 76 is continuous from the front ridge 64. As shown in FIG. 6, the first bead 77 includes a curved surface 77a that has a generating line extending in a front-rear direction and is curved so as to swell outward.

The rear side sill portion 61c includes a second bead 79 that extends in the front-rear direction behind the base portion 52 and forms a second groove 78 between the second bead 79 and the base portion 52 along the rear ridge 66. A side wall of the second groove 78 is continuous from the rear ridge 66. Like the first bead 77, the second bead 79 includes a curved surface 79a that has a generating line extending in a front-rear direction and is curved so as to swell outward. Here, a structure of the second bead 79 is schematically shown in FIG. 6 with reference numerals in parentheses.

Figure 7:
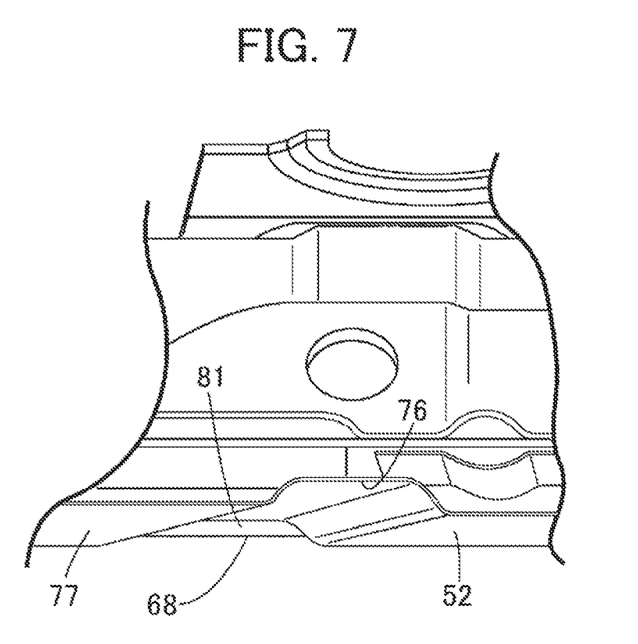
FIG. 7 is a cross-sectional view taken along a line 7-7 in FIG. 5; (second embodiment)

An upper end and a lower end of the first groove 76 are partitioned by steps 81 that are formed on extension lines of an upper edge and a lower edge of the first bead 77. As shown in FIG. 7, the step 81 defines an upper step on the outer surface of the front vertical wall 68 and defines a lower step on the bottom of the first groove 76. The step 81 may be formed in a plurality of steps, and may define an uppermost step on the outer surface of the front vertical wall 68 and define a lowermost step on the bottom of the first groove 76.

Figure 8:
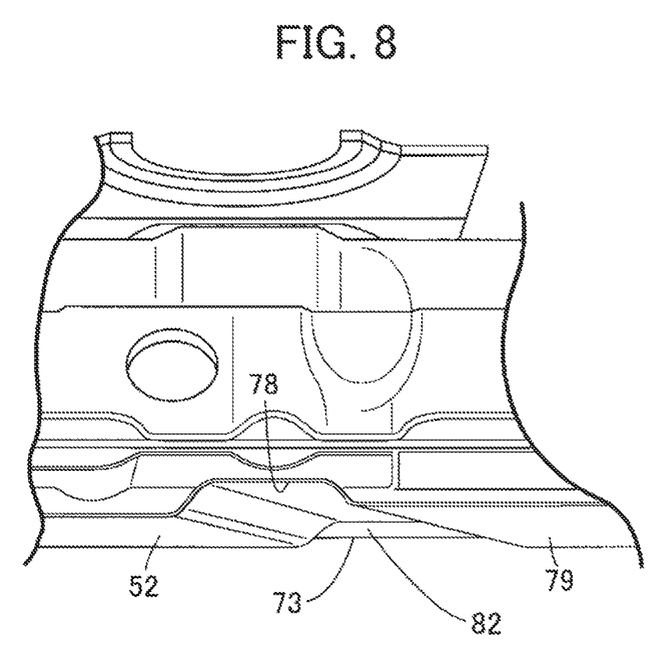
FIG. 8 is a cross-sectional view taken along a line 8-8 in FIG. 5; (second embodiment)

An upper end and a lower end of the second groove 78 are partitioned by steps 82 that are formed on extension lines of an upper edge and a lower edge of the second bead 79. As shown in FIG. 8, the step 82 defines an upper step on the outer surface of the rear vertical wall 73 and defines a lower step on the bottom of the second groove 78. The step 82 may be formed in a plurality of steps, and may define an uppermost step on the outer surface of the rear vertical wall 73 and define a lowermost step on the bottom of the second groove 78.

Figure 9:
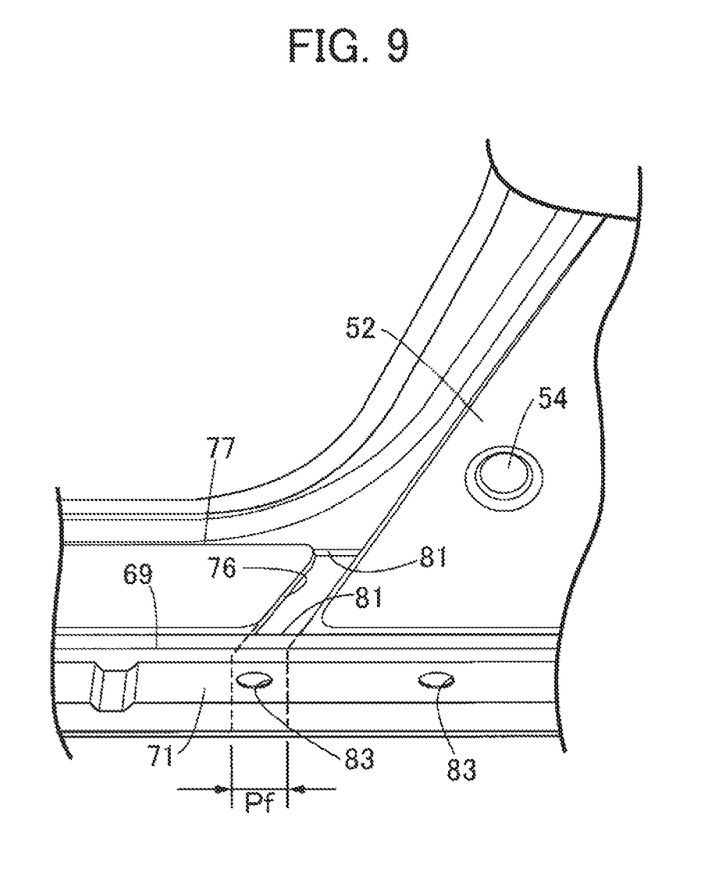
FIG. 9 is an enlarged perspective view showing a front side sill portion of the side outer panel; (second embodiment)

As shown in FIG. 9, the front lower wall 71 of the front side sill portion 61*b* includes an electrodeposition hole 83 formed at a front-rear direction position Pf intersecting the first groove 76. The front-rear direction position Pf may be set based on an intersection of the extension line of the first groove 76 and the third ridge 69. The electrodeposition hole 83 may be arranged at least partially at the front-rear direction position Pf. The electrodeposition hole 83 may be formed so as to cross the front-rear direction position Pf.

Figure 10:
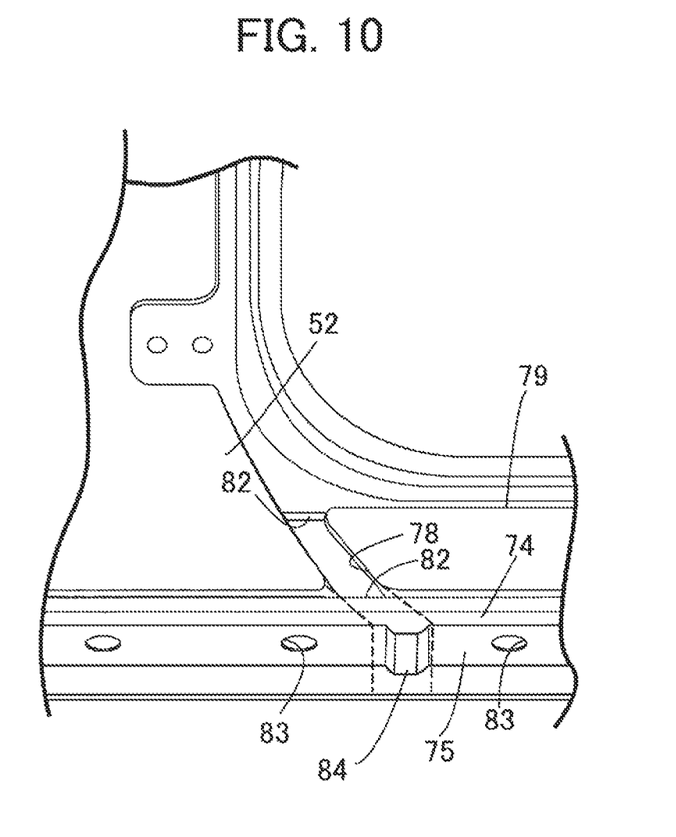
FIG. 10 is an enlarged perspective view showing a rear side sill portion of the side outer panel; (second embodiment)

As shown in FIG. 10, the rear lower wall 75 of the rear side sill portion 61*c* includes a bead 84 formed at the front-rear direction position Pr intersecting the second groove 78 and extending orthogonally to the fourth ridge 74. The bead 84 is formed so as to swell downward from the rear lower wall 75, for example. The front-rear direction position Pr may be set based on an intersection of the extension line of the second groove 78 and the fourth ridge 74. The bead 34 may be arranged at least partially at the front-rear direction position Pr.

Figure 11A:
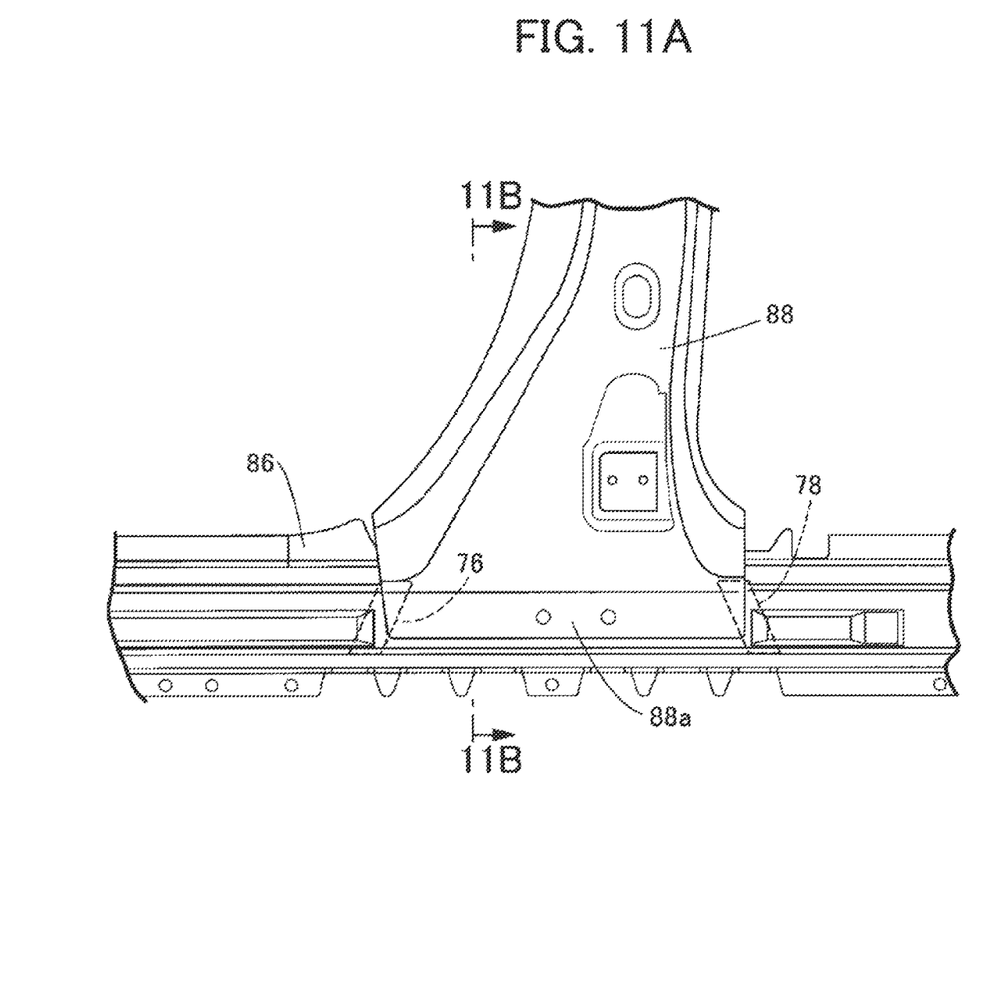
FIG. 11 is an enlarged side view (A) showing a side sill stiffener and a center pillar stiffener and a cross-sectional view (B) taken along a line 11B-11B. (second embodiment).
Figure 11B:
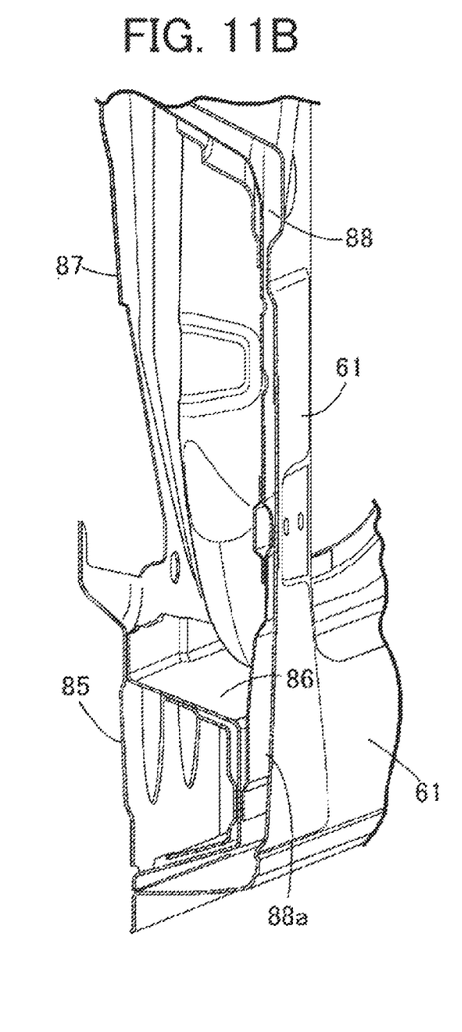

As shown in FIG. 11, the side panel 16 includes a side sill stiffener 86 that is joined to the side sill inner panel 85 to form the side sill 27 and a center pillar stiffener 88 that is joined to the center pillar inner panel 37 to form the center pillar 26. The side sill stiffener 36 is joined to the side sill inner panel 85 to form a tubular hollow structure. Thus, the flexural strength of the side sill 27 is reinforced. The side sill stiffener 86 is covered with the front side sill portion 61*b* and the rear side sill portion 61*c* of the side outer panel 61 joined to the side sill inner panel 85. The side sill 27 of the side panel 16 is formed by the side sill inner panel 85, the side sill stiffener 86, and the side outer panel 61.

The center pillar stiffener 88 is joined to the center pillar inner panel 87 to form a tubular hollow structure. Thus, the flexural strength of the center pillar 26 is reinforced. The center pillar stiffener 88 is covered with the center pillar portion 61*a* of the side outer panel 61 joined to the center pillar inner panel 87. The center pillar 26 is formed by the center pillar inner panel 87, the center pillar stiffener 88, and the side outer panel 62. The center pillar inner panel 87 and the side sill inner panel 85 may be formed from one continuous steel plate.

The center pillar stiffener 88 includes a lower end 83*a* partitioned in the front-rear direction at the first groove 76 and the second groove 78. The center pillar stiffener 88 is coupled to the side sill stiffener 86 at the lower end 88*a*. For example, welding can be used for coupling. The center pillar stiffener 88 overlaps with the side sill stiffener 86, and thus the flexural strength of the side sill 27 can be further increased in the front-rear direction.

The side outer panel 61 is subjected to painting when the vehicle 11 is manufactured. For example, electrodeposition painting is used for the painting. In the electrodeposition painting, the side outer panel 61 pulled up from a painting liquid is heated. A painting film of the side outer panel 61 is dried by the heating. At this time, the front side sill portion 61*b* and the rear side sill portion 61*c* of the side outer panel 61 are thermally expanded in the front-rear direction based on the heating. Since rigidity of the base portion 52 and the auxiliary base portion 62 is ensured by the behavior of the swelling forming the front ridge 64 and the rear ridge 66, the thermal expansion of the front side sill portion 61*b* and the thermal expansion of the rear side sill portion 61*c* can be absorbed according to the collapse of the first groove 76 and the second groove 78. Here, when the first groove 76 collapses, the side wall on the base portion continuous from the front ridge 64 and the side wall on the first bead facing the side wall fall down with respect to the bottom wall of the first groove 76. When the second groove 78 collapses, the side wall on the base portion continuous from the rear ridge 66 and the side wall on the second bead facing the side wall fall down with respect to the bottom wall of the second groove 78. In this way, the occurrence of permanent strain of the side outer panel 61 can be prevented (avoided) in the side sill 27 below the center pillar 26. Since only the first groove 76 and the second groove 78 collapse, the visible deformation of the side sill 27 can be prevented (avoided).

In the present embodiment, the side wall of the first groove 76 is continuous from the front ridge 64, and the side wall of the second groove 73 is continuous from the rear ridge 66. Therefore, when the side otter panel 61 appears on the exterior of the vehicle 11, the first groove 76 and the second groove 73 are visually integrated with the base portion 52, and thus the deterioration of the appearance can be prevented regardless of the formation of the first groove 76 and the second groove 78.

In the side outer panel 61 according to the present embodiment, the front side sill portion 61*b* is formed with the first bead 77 extending in the front-rear direction, and the rear side sill portion 61*c* is formed with the second bead 79 extending in the front-rear direction. Thus, since the front side sill portion 61*b* and the rear side sill portion 61*c* are enhanced in flexural rigidity in the front-rear direction, it is possible to promote the collapse of the first groove 76 and the second groove 78 while preventing the deformation of the front side sill portion 61*b* and the rear side sill portion 61*c*.

The first bead 77 and the second bead 79 according to the present embodiment include the curved surfaces 77*a* and 79*a* that have a generating line extending in the front-rear direction and are curved so as to swell outward, respectively. Since the front side sill portion 61*b* and the rear side sill portion 61*c* are enhanced in flexural rigidity in the front-rear direction, it is possible to promote the collapse of the first groove 76 and the second groove 78 while preventing the deformation of the front side sill portion 61*b* and the rear side sill portion 61*c*. Moreover, since the first bead 77 and the second bead 79 form the curved surfaces 77*a* and 79*a* that swell outward, respectively, the first bead 77 and the second bead 79 can be satisfactorily visually recognized from a line of sight looking downward of the occupant getting on and off. The existence of the vertical wall can be confirmed. Designability can be ensured. When the vertical wall of the bead is hidden from the line of sight looking downward of the occupant, the occupant misunderstands that the vertical wall is missing. It becomes a design that makes feel instability of the structure.

In the side outer panel 61 according to the present embodiment, the upper end and the lower end of the first groove 76 are partitioned by the steps 81 that are formed on the extension lines of the upper edge and the lower edge of the first bead 77, respectively, and the upper end and the lower end of the second groove 78 are partitioned by the steps 82 that are formed on the extension lines of the upper edge and the lower edge of the second bead 79, respectively. The depth of the first groove 76 and the second groove 78 can be increased by the behavior of the steps 81 and 82. Deformation of the first groove 76 and the second groove 78 can be promoted when the first groove 76 and the second groove 78 are deepened. Moreover, since the steps 81 and 82 extend in the straight line from the first bead 77 and the second bead 79, a complicated uneven shape can be reduced and the appearance can be satisfactorily ensured.

In the present embodiment, the front lower wall 71 of the front side sill portion 61b includes the electrodeposition hole 83 formed at the front-rear direction position Pf intersecting the first groove 76. Since the strength of the front lower wall 71 is weakened at the front-rear direction position Pf intersecting the first groove 76 by the behavior of the electrodeposition hole 83, the deformation of the bottom wall can be promoted in the first groove 76 in addition to the fall of the side wall. The collapse of the first groove 76 can be further accelerated. In this way, the thermal expansion of the front side sill portion 61b can be absorbed. In the side sill 27, the occurrence of the permanent strain of the side outer panel 61 can be prevented (avoided).

In the present embodiment, the rear lower wall 75 of the rear side sill portion 61c includes the bead 84 that is formed at the front-rear direction position Pr intersecting the second groove 78 and extends orthogonally to the fourth ridge 74. The bead 84 can prevent spring-back between the rear vertical wall 73 and the rear lower wall 75 at the time of molding the side outer panel 61. Although the bead 84 is formed on the rear lower wall 75 at the front-rear direction position Pr intersecting the second groove 78, a stress is concentrated at a central position of the side sill 27 in the front-rear direction, the stress concentrated in this way is absorbed by the first groove 76, and the second groove 78 on the rear side plays a complementary role, whereby the bead 84 does not hinder the prevention of the thermal expansion.

The side outer panel 61 includes the auxiliary base portion 62 that swells from the outer surface while continuing upward from the base portion 52, the door hinge area 53 being arranged between the auxiliary base portion 62 and the base portion 52. Since the base portion 52 and the auxiliary base portion 62 are continuous so as to surround the door hinge area 53, it is possible to reduce a complicated uneven shape and further improve the appearance. Such simplification of the uneven shape can prevent the occurrence of wrinkles during a pressing process of the side outer panel 61. Moreover, since the rigidity of the base portion 52 is further increased due to the addition of the auxiliary base portion 62, the absorption of thermal expansion can be further promoted in the first groove 76 and the second groove 78.

In the present embodiment, the base portion 52 forms the receiving body 54 that swells in the truncated cone shape from the outer surface at the position closer to the first groove 76 than the second groove 78 and receives the stopper of the front side door at the closed position of the front side door. In the base portion 52, the rigidity can be increased on the side of the first groove 76 as compared with the side of the second groove 78. Since the stress is concentrated at the central position of the side sill 27 in the front-rear direction, the collapse of the first groove 76 can be satisfactorily promoted.

The center pillar stiffener 88 according to the present embodiment is coupled to the side sill stiffener 86 at the lower end 88a partitioned in the front-rear direction at the first groove 76 and the second groove 78. During a side collision, the impact acting on the center pillar stiffener 88 is supported by the side sill 27 coupled to the lower end 88a of the center pillar stiffener 88. At this time, since the first groove 76 and the second groove 78 are arranged at the edge of the center pillar stiffener 88, the first groove 76 and the second groove 78 do not affect the collision performance during the side collision.

The invention claimed is:

1. A vehicle body (12) comprising:
a center pillar (26) that is located at a boundary between a front side door (13) and a rear side door (14) and extends downward from a roof (18);
a side sill (27) that is coupled to a lower end of the center pillar (26) and partitions a lower end of a door openings (15) opened and closed by the front side door (13) and the rear side door (14); and
a side outer panel (25, 61) that forms an outer surface with the center pillar (26) and the side sill (27) and includes a first ridge (29) that partitions an opening (15a) for the front side door (13) and a second ridge (32) that partitions an opening (15b) for the rear side door (14), wherein
the side outer panel (25, 61) includes:
a base portion (52) that swells from the outer surface, and forms a front ridge (48, 64) extending along the first ridge (29) of the center pillar (26) and crossing an upper edge (47, 63) of the side sill (27), and a rear ridge (51, 66) extending along the second ridge (32) of the center pillar (26) and crossing an upper edge (49, 65) of the side sill (27);
a front side sill portion (25b, 61b) that extends in a front-rear direction in front of the base portion (52) and forms a first groove (55, 76) between the front side sill portion (25b, 61b) and the base portion (52); and
a rear side sill portion (25c, 61c) that extends in the front-rear direction behind the base portion (52) and forms a second groove (57, 78) between the rear side sill portion (25c, 61c) and the base portion (52).

2. The vehicle body according to claim 1, wherein a side wall of the first groove (55, 76) is continuous from the front ridge (48, 64), and a side wall of the second groove (57, 78) is continuous from the rear ridge (51, 66).

3. The vehicle body according to claim 1, further comprising a first bead (56, 77) that is formed on the front side sill portion (25b, 61b) and extends in the front-rear direction and a second bead (58, 79) that is formed on the rear side sill portion (25c, 61c) and extends in the front-rear direction.

4. The vehicle body according to claim 3, wherein the first bead (56) and the second bead (58) include beads (56b, 58b) that are recessed inward within beads (56a, 58a) that swell outward, respectively.

5. The vehicle body according to claim 3, wherein the first bead (77) and the second bead (79) include curved surfaces (77a, 79a) that have a generating line extending in the front-rear direction and are curved so as to swell outward, respectively.

6. The vehicle body according to claim 3, wherein an upper end and a lower end of the first groove (76) are partitioned by steps (81) that are formed on extension lines of an upper edge and a lower edge of the first bead (77), respectively, and an upper end and a lower end of the second groove (78) are partitioned by steps (82) that are formed on extension lines of an upper edge and a lower edge of the second bead (79), respectively.

7. The vehicle body according to claim 1, wherein the side outer panel (61) includes:

a front upper wall (67) that extends continuously from the center pillar (26) so as to surround the opening (15*a*) for the front side door (13);

a front vertical wall (68) that is formed by bending downward from an outer end of the front upper wall (67) and spreads along a vertical plane to define the first ridge (29) between the front vertical wall (68) and the front upper wall (67); and a front lower wall (71) that is formed by bending toward an interior space from a lower end of the front vertical wall (68) to define a third ridge (69) between the front lower wall (71) and the front vertical wall (68), and the front lower wall (71) includes an electrodeposition hole (83) formed at a front-rear direction position (Pf) intersecting the first groove (76).

8. The vehicle body according to claim 1, wherein the side outer panel includes:

a rear upper wall (72) that extends continuously from the center pillar (26) so as to surround the opening (15*b*) for the rear side door (14);

a rear vertical wall (73) that is formed by bending downward from an outer end of the rear upper wall (72) and spreads along a vertical plane to define the second ridge (32) between the rear vertical wall (73) and the rear upper wall (72); and a rear lower wall (75) that is formed by bending toward an interior space from a lower end of the rear vertical wall (73) to define a fourth ridge (74) between the rear lower wall (75) and the rear vertical wall (73), and the rear lower wall (75) includes a bead (84) formed at a front-rear direction position (Pr) intersecting the second groove (78) and extending orthogonally to the fourth ridge (74).

9. The vehicle body according to claim 1, wherein the side outer panel (61) further includes an auxiliary base portion (62) that swells from the outer surface while continuing upward from the base portion (52), a door hinge mounting area (53) being arranged between the auxiliary base portion (62) and the base portion (52).

10. The vehicle body according to claim 1, wherein the base portion (52) forms a receiving body (54) that swells in a truncated cone shape from the outer surface at a position closer to the first groove (55, 76) than the second groove (57, 78) and is configured to receive a stopper of the front side door (13) at a closed position of the front side door (13).

11. The vehicle body according to claim 1, further comprising:

a side sill stiffener (86) that is joined to a side sill inner panel (85) to form the side sill (27) while reinforcing a flexural strength of the side sill (27); and a center pillar stiffener (88) that is joined to a center pillar inner panel (87) to form the center pillar (26) while reinforcing a flexural strength of the center pillar (26) and is coupled to the side sill stiffener (86) at a lower end (88*a*) partitioned in the front-rear direction at the first groove (76) and the second groove (78).

12. The vehicle body according to claim 2, further comprising a first bead (56, 77) that is formed on the front side sill portion (25*b*, 61*b*) and extends in the front-rear direction and a second bead (58, 79) that is formed on the rear side sill portion (25*c*, 61*c*) and extends in the front-rear direction.

* * * * *